United States Patent
Cox

(10) Patent No.: US 10,065,483 B2
(45) Date of Patent: Sep. 4, 2018

(54) MODULAR SUN VISOR SYSTEM

(71) Applicant: TeraFlex, Inc., West Jordan, UT (US)

(72) Inventor: Christopher Paul Cox, West Jordan, UT (US)

(73) Assignee: TeraFlex, Inc., West Jordan, UT (US)

( * ) Notice: Subject to any disclaimer, the term of this patent is extended or adjusted under 35 U.S.C. 154(b) by 13 days.

(21) Appl. No.: 15/338,169

(22) Filed: Oct. 28, 2016

(65) Prior Publication Data

US 2018/0117996 A1    May 3, 2018

(51) Int. Cl.
*B60J 3/02* (2006.01)
*B60J 3/00* (2006.01)

(52) U.S. Cl.
CPC .......... *B60J 3/0265* (2013.01); *B60J 3/007* (2013.01); *B60J 3/0217* (2013.01); *B60J 3/0282* (2013.01)

(58) Field of Classification Search
CPC ......... B60J 3/0282; B60J 3/007; B60J 3/0265
USPC ................................................ 296/97.2, 97.6
See application file for complete search history.

(56) References Cited

U.S. PATENT DOCUMENTS

| | | | |
|---|---|---|---|
| 171,256 A * | 12/1875 | Backus | F03B 1/04 415/63 |
| 3,477,678 A | 11/1969 | Icke et al. | |
| 4,053,180 A | 10/1977 | White | |
| 4,844,533 A | 7/1989 | Dowd et al. | |
| 4,888,072 A | 12/1989 | Ohlenforst et al. | |
| 4,902,068 A | 2/1990 | Dowd et al. | |
| 4,940,273 A | 7/1990 | Konishi | |
| 5,104,174 A * | 4/1992 | Gute | B60J 3/0208 296/97.4 |
| 5,127,700 A * | 7/1992 | Joe | B60J 3/0282 296/97.5 |
| 5,374,097 A | 12/1994 | George et al. | |
| 5,421,632 A | 6/1995 | Adomeit et al. | |
| D367,029 S * | 2/1996 | Spaulding | D12/191 |
| 5,513,892 A * | 5/1996 | Thomas | B60J 3/0208 296/97.2 |
| 6,021,986 A | 2/2000 | Murdock | |
| 6,325,442 B1 * | 12/2001 | Hunker | B60J 3/0208 296/97.1 |
| 6,439,638 B1 * | 8/2002 | Kawasaki | B60J 3/0204 296/97.2 |

(Continued)

FOREIGN PATENT DOCUMENTS

DE    27 44 594 A1    4/1979

*Primary Examiner* — Pinel E Romain
(74) *Attorney, Agent, or Firm* — Christensen O'Connor Johnson Kindness PLLC

(57) ABSTRACT

A visor assembly for a vehicle includes a mount assembly secured to a portion of the vehicle. The visor assembly further includes a first visor mounted to the mount assembly to be selectively rotated between a first stowed position and a first deployed position. The first visor is at least partially translucent and has a first face and a second face. A second visor is mounted to the mount assembly to be selectively rotatable between a second stowed position and a second deployed position. A first face of the second visor is positioned adjacent to the second face of the first visor when the first visor is in the first deployed position and the second visor is in the second deployed position. At least a portion of light traveling through the first visor exits the second face of the first visor and strikes the first face of the second visor.

13 Claims, 14 Drawing Sheets

(56) References Cited

U.S. PATENT DOCUMENTS

| | | | |
|---|---|---|---|
| 6,705,661 B2* | 3/2004 | Amirmoini | B60J 3/0208 296/97.1 |
| 7,036,965 B2 | 5/2006 | Dalton, Jr. et al. | |
| 7,216,918 B1* | 5/2007 | Runfola | B60J 3/0204 296/97.11 |
| 7,232,176 B1* | 6/2007 | Dopwell | B60J 3/0204 160/23.1 |
| 7,311,427 B2 | 12/2007 | Barker et al. | |
| 7,446,650 B2 | 11/2008 | Scholfield et al. | |
| 7,537,263 B2* | 5/2009 | Delphia | B60J 3/0208 296/97.1 |
| 8,424,950 B2 | 4/2013 | Ebisuoka | |
| 8,550,531 B1* | 10/2013 | Fancher, III | B60J 3/0208 296/97.1 |
| 9,174,516 B2 | 11/2015 | Lin et al. | |
| 9,205,724 B2 | 12/2015 | Marcus et al. | |
| 9,493,055 B1* | 11/2016 | Murat | B60J 3/0208 |
| 2004/0051503 A1 | 3/2004 | Fan | |
| 2005/0127704 A1* | 6/2005 | Tiesler | B60J 3/0278 296/97.1 |
| 2006/0087147 A1* | 4/2006 | Kleyn | B60J 3/0204 296/97.1 |
| 2007/0120388 A1* | 5/2007 | Araga | B60J 3/0278 296/97.1 |
| 2007/0187976 A1 | 8/2007 | Hamelink et al. | |
| 2009/0134656 A1* | 5/2009 | Mori | B60J 3/0208 296/97.4 |
| 2009/0236869 A1 | 9/2009 | Newgarden, Jr. | |
| 2015/0197138 A1* | 7/2015 | Kuenzel | B60J 3/0208 296/97.6 |
| 2016/0167490 A1 | 6/2016 | Janowiak et al. | |
| 2017/0326953 A1* | 11/2017 | Ngo | B60J 3/0239 |

* cited by examiner

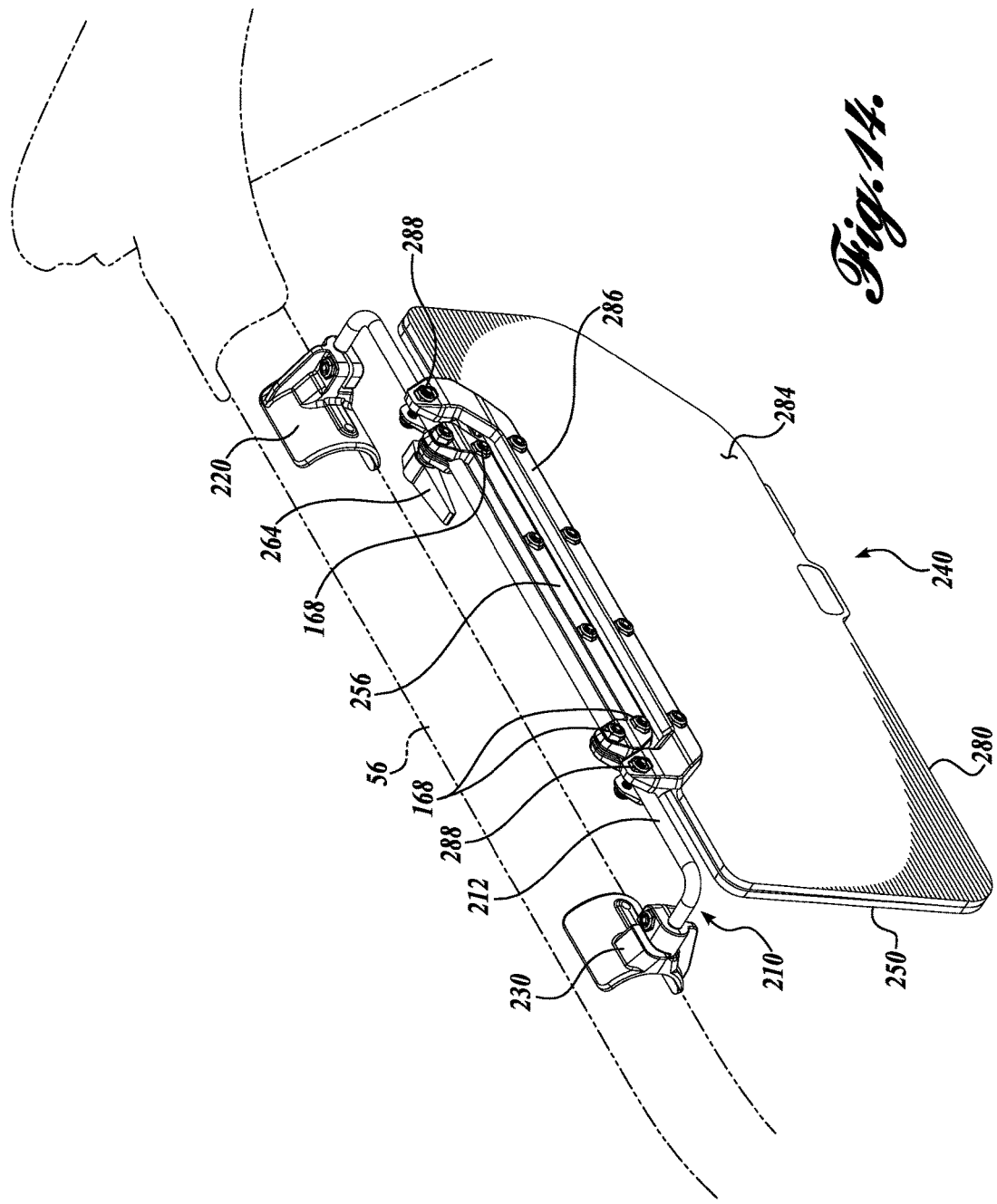

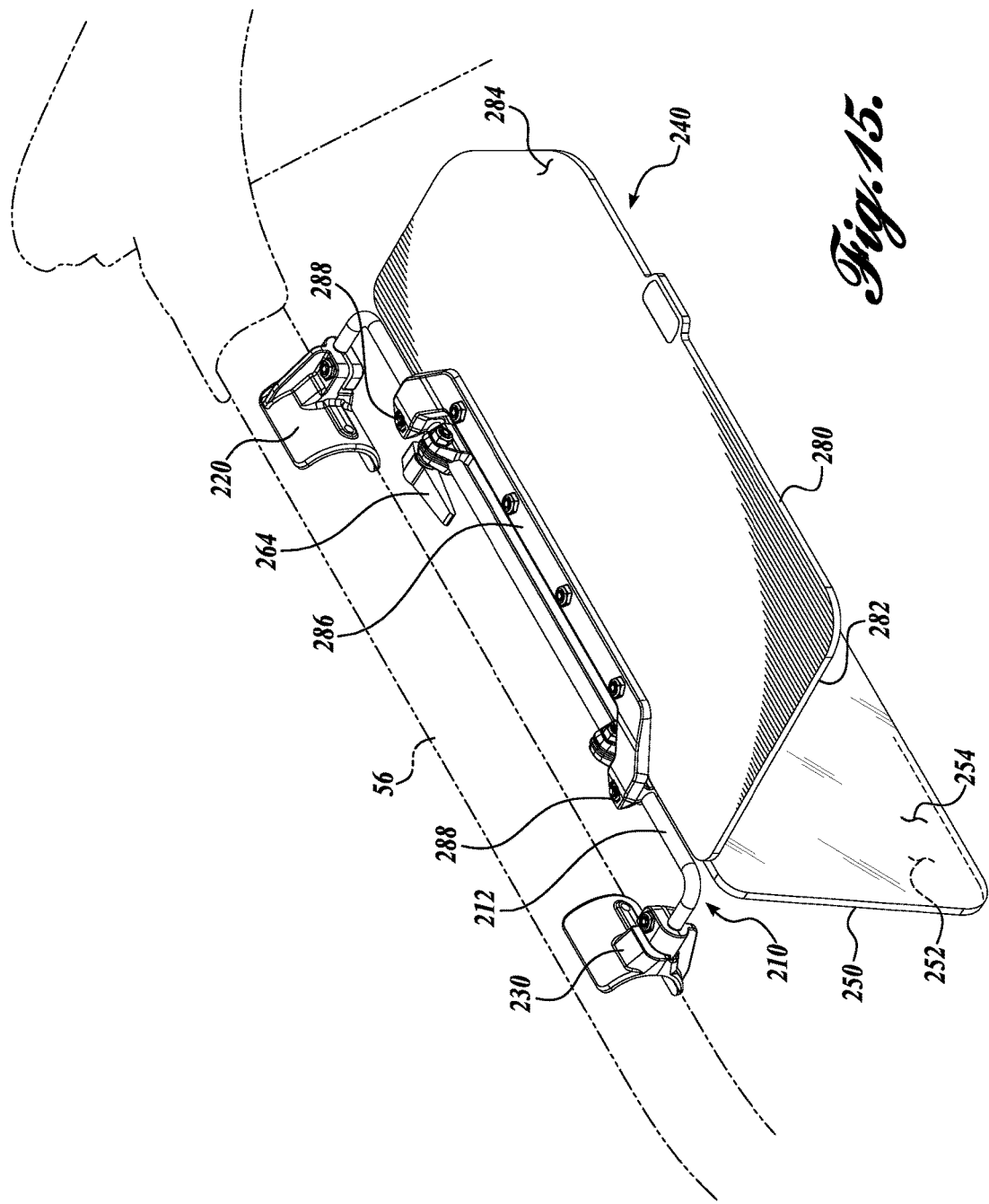

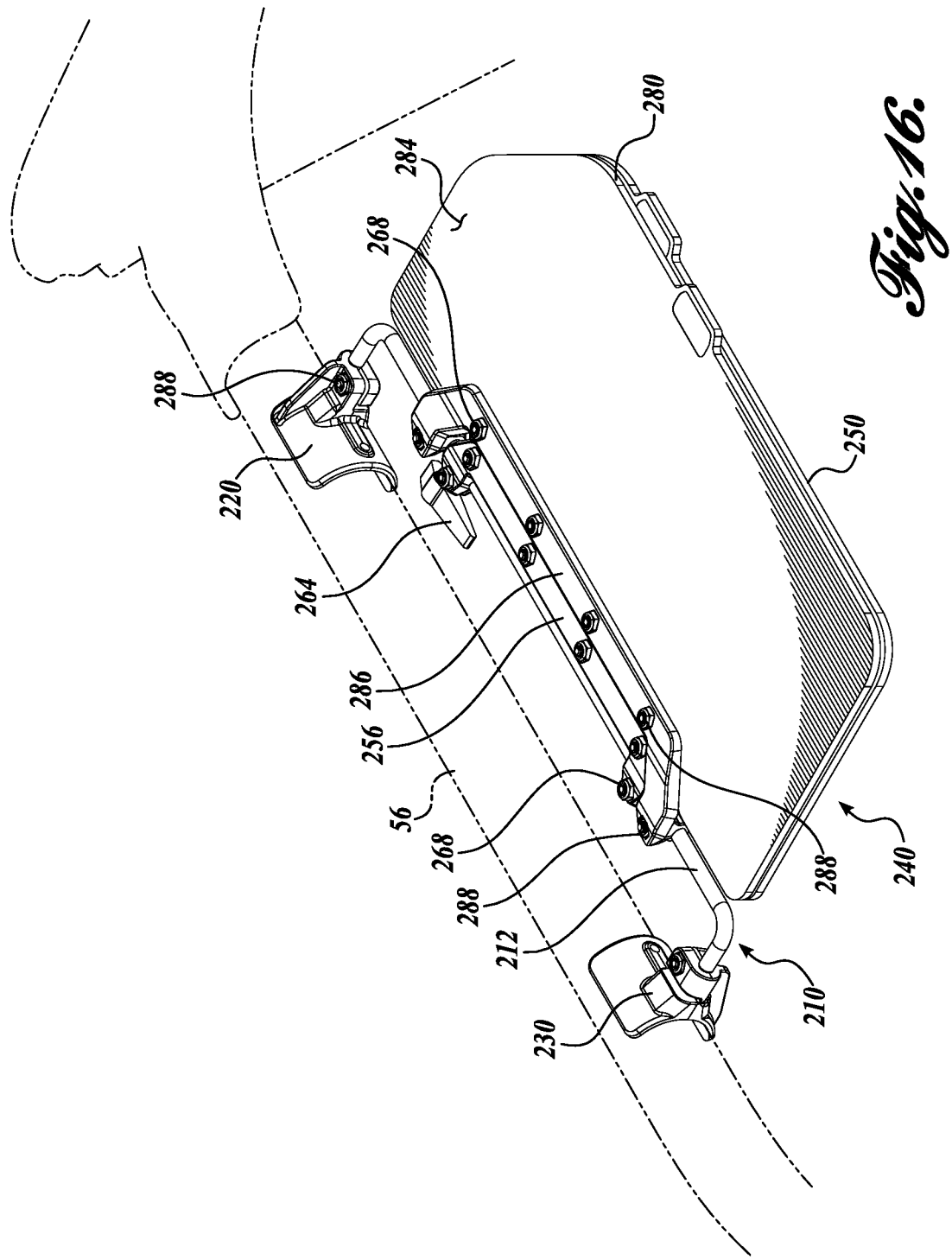

MODULAR SUN VISOR SYSTEM

BACKGROUND

Most passenger vehicles are equipped with a sun visor on both the driver side and the passenger side. The visors are typically located attached to the vehicle headliner along the edge of the vehicle windshield. The sun visors are rotatable between a raised (stowed) position and lowered (deployed) position. In the stowed position, the visor is extends rearwardly along the headliner in a generally horizontal position so that the visor does not block the windshield. In the deployed position, the visor extends downward to block some of the light that has entered through an upper portion of the windshield. Many sun visors can also be rotated away from the windshield to the side door window to block glare when sunlight is entering from the side of the vehicle. By blocking the light entering through the upper portion of the windshield or the side window, visors decrease glare to the driver and passenger, increasing safety and comfort during bright conditions. However, by their nature, sun visors tend to reduce a driver's visibility by reducing the area of the windshield through which objects outside of the vehicle are visible.

Some vehicles utilize tinted windows to reduce glare. Tinted windows generally are formed by applying a coating to a window, wherein the coating filters out light from various parts of the spectrum, such as ultraviolet light.

The effectiveness of window tint is typically classified as visible light transmission (VLT). VLT is the measurable amount of incident light that travels through a medium. More specifically, VLT is typically expressed as percentage of visible solar light, i.e., daylight, that travels through a material. Accordingly, a higher VLT is indicative of a material that allows more sunlight to pass through (a lighter tint), and a lower VLT indicates that the material restricts more light from passing through (a darker tint).

Individual states have laws mandating a minimum VLT for tinted windows on vehicle, i.e., how dark can the tint be. The minimum VLT varies by window and by state, but the minimum VLT for a front windshield is typically in the range of 33% to 50%.

While tinted windows can be effective for reducing glare, they are not without limitations. As noted, there are legal limits to how dark a tint may be. However, perhaps the biggest drawback to tinted windows is the inability to adjust to different lighting conditions. Because the VLT of a tinted window is fixed, the tint may filter out too much light under low light conditions. Conversely, a tinted window may be such that not enough light is filtered out under bright conditions. Thus, there is a need to provide a glare reduction system wherein the amount of glare reduction can be varied to accommodate different conditions.

SUMMARY

A first representative embodiment of a disclosed visor assembly is suitable for use in a vehicle. The visor assembly includes a mount assembly secured to a portion of the vehicle. The visor assembly further includes a first visor mounted to the mount assembly to be selectively rotated between a first stowed position and a first deployed position. The first visor is at least partially translucent and has a first face and a second face. A second visor is mounted to the mount assembly to be selectively rotatable between a second stowed position and a second deployed position. A first face of the second visor is positioned adjacent to the second face of the first visor when the first visor is in the first deployed position and the second visor is in the second deployed position. At least a portion of light traveling through the first visor exits the second face of the first visor and strikes the first face of the second visor.

A second representative embodiment of a disclosed visor assembly is suitable for use in a vehicle. The visor assembly includes a first visor rotatably coupled to rod that is mounted to the vehicle. The first visor is selectively rotatable between a first stowed position and a first deployed position, and has a first visible light transmission (VLT) percentage. A second visor is also coupled to the rod to be selectively rotatable between a second stowed position and a second deployed position. The second visor has a second VLT percentage. The first and second visors extend downward from the rod in the first and second deployed positions, respectively, so that the first and second visors are in a line of site of a vehicle operator.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 14 shows a top rear isometric view of a side mount assembly and a side visor assembly of the sun visor system of FIG. 1, with a first visor and a second visor of the side visor assembly each in a deployed position;

FIG. 15 a top rear isometric view of the side visor assembly of FIG. 14, with the first visor in a deployed position and the second visor in the stowed position; and FIG. 16 a top rear isometric view of the side visor assembly of FIG. 14, with the first visor and the second visor each in a deployed position.

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "inner," "outer," "lateral," "medial," "inboard," "outboard," "extended," etc. These references, and other similar references in the present application, are only to assist in helping describe and to understand the particular embodiment and are not intended to limit the present disclosure to these directions or locations.

Figure 1:
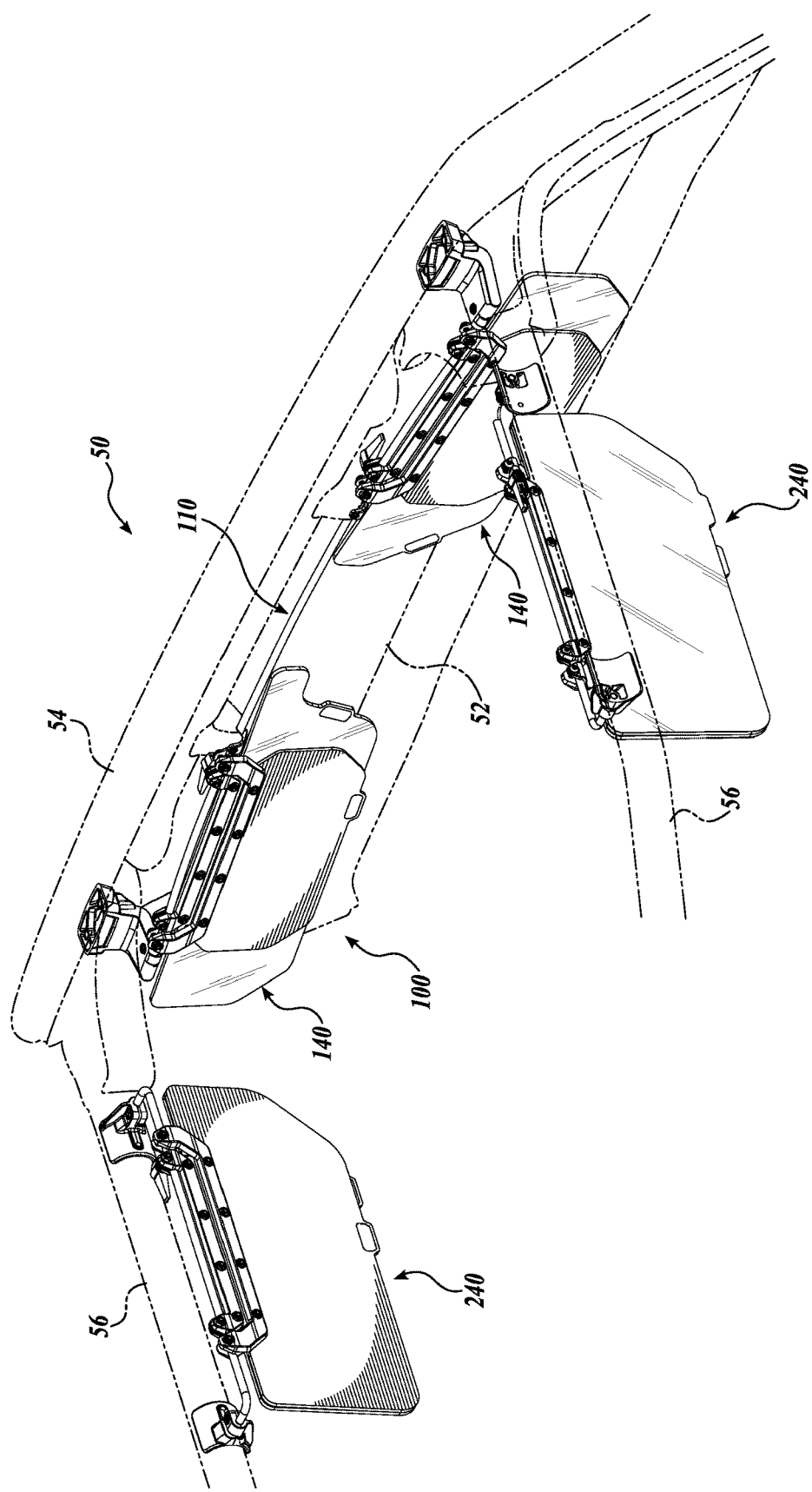
FIG. 1 shows a partial top rear isometric view of a vehicle with a representative embodiment of a disclosed modular sun visor system.

FIG. 1 shows a portion of a vehicle 50 with a representative embodiment of a disclosed modular sun visor assembly 100. The vehicle includes a windshield 52 and a headliner 54, a portion of which extends across the upper edge of the windshield. The vehicle also includes side roll bars 56 extending rearwardly from the upper side corners of the windshield 52 so as to be positioned above the driver and passenger door windows (not shown).

The illustrated embodiment shows a sun visor assembly 100 mounted to an off-road vehicle having a roll bar and a headliner. It will be appreciated that sun visor assembly 100 may also be used on various other types of vehicles, including but not limited to various other cars, buses, pickup trucks, sports utility vehicles, heavy duty vehicles, such as class 8 trucks, or any other vehicle on which a sun visor may be desirable. In addition, the sun visor assembly 100 need not be mounted to a headliner and/or roll bars, as shown in the illustrated embodiment, but may be mounted to any suitable vehicle structure using any known methods and configurations. These and other variations to the use of the disclosed sun visor assembly are contemplated and should be considered within the scope of the present disclosure.

The illustrated sun visor assembly 100 shown in FIG. 1 includes a pair of forward visor assemblies 140, with one forward visor assembly 140 being positioned on the driver side, and the other forward visor assembly 140 being positioned on the passenger side. The sun visor assembly 100 further includes a side visor assembly 240 located at each side of the vehicle so that each side visor assembly extends along the top edge of either the driver side window or the passenger side window.

It will be appreciated that alternate embodiments of the disclosed sun visor assembly 100 may be employed within the scope of the present disclosure. For example, in the illustrated embodiment, the forward visor assemblies 140 are mounted to a single forward mount assembly 110, which will be described below, but it will be appreciated that separate mount assemblies can be utilized such that each visor assembly has a separate mount assembly to which it is attached. It will be further appreciated that sun visor assembly need not include two forward visor assemblies 140 in conjunction with two side visor assemblies 240. In this regard, any number of individual visor assemblies or combinations of visor assemblies may be included. In addition, the position of each visor assemblies is not limited to the illustrated embodiment. Thus, any number of visor assemblies may be included in any number of suitable locations within the scope of the present disclosure.

Figure 2:
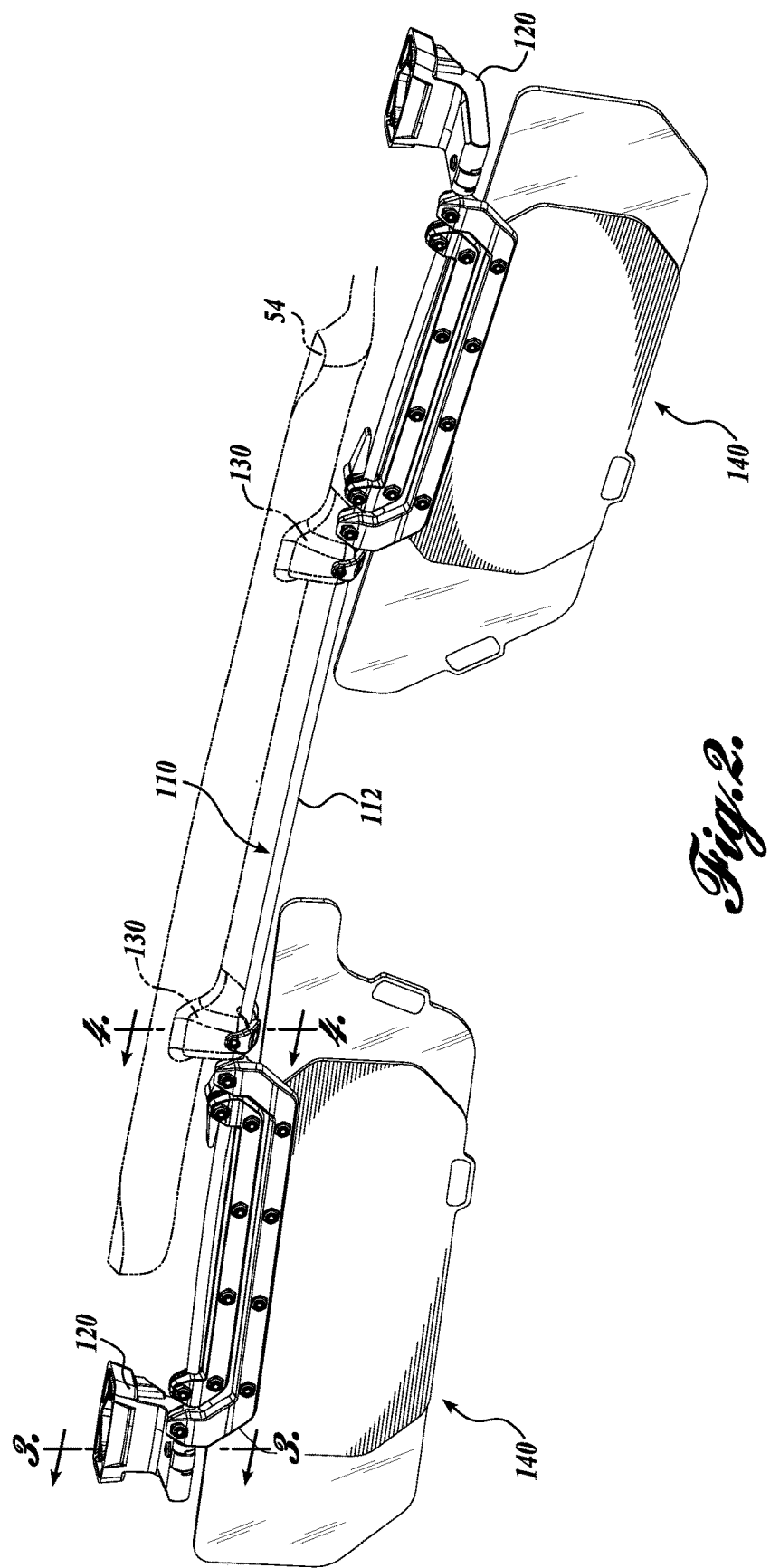
FIG. 2 shows a top rear isometric view of a forward mount assembly and two forward visor assemblies of the sun visor system of FIG. 1.
Figure 3:
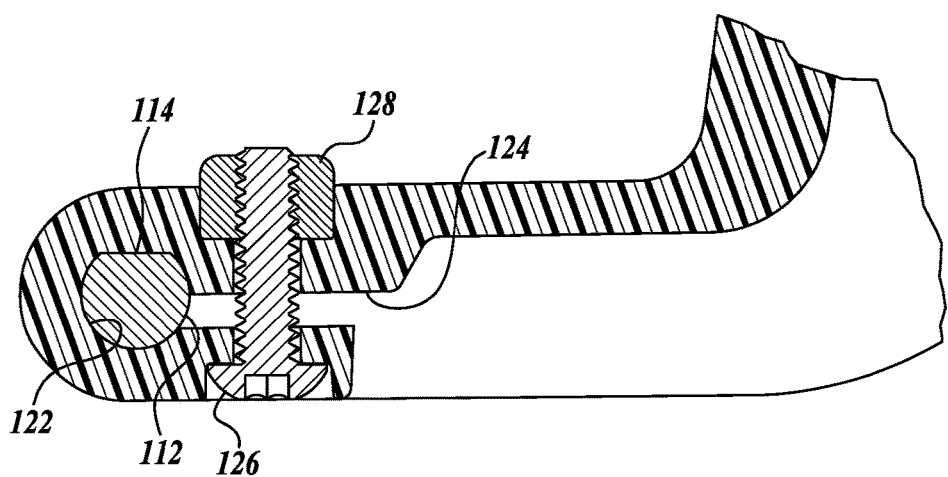
FIG. 3 shows a partial side cross-sectional view of an outer mounting support of the forward mount assembly of FIG. 2.

Referring now to FIG. 2, the forward mount assembly 110 includes an elongate rod 112 extending laterally across the front of the vehicle interior, proximate to the upper edge of the windshield 52. The rod 112 is mounted to the vehicle using a plurality of mounting supports. In the illustrated embodiment, an outer mounting support 120 is positioned at each end of the rod 112 and is secure to the vehicle headliner 54 or other structure using any suitable configuration. As shown in FIG. 3, the rod 112 has a flat 114 formed in the area in which the rod engages the outer mounting support 120. The outer mounting support 120, in turn, has an aperture 122 sized and configured to receive and engage the rod 112 and the flat 114. A slot 112 extends radially from the aperture 122, and a threaded fastener 126 extends through the outer mounting support 120 and the slot. The fastener 126 is secured in place with a nut 128 such that tightening and loosening the fastener 126 increases and decreases, respectfully, a clamping force applied by the outer mounting support 120 to the rod. In this manner, the outer mounting support 120 clamps down on the rod 112 to prevent axial movement of the rod relative to the outer mounting support 120, and the engagement of the flat 114 with the aperture 122 prevents the rod from rotating within the outer mounting support.

Figure 4:
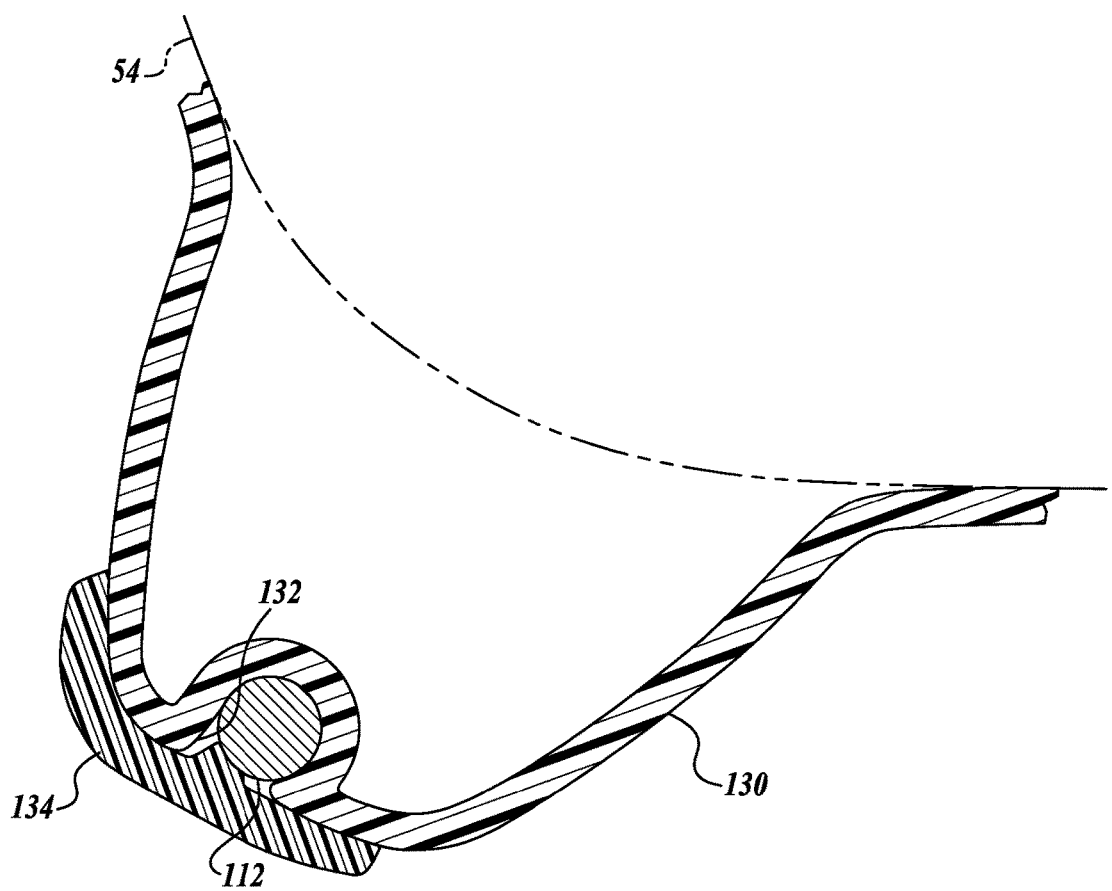
FIG. 4 shows a partial side cross-sectional view of an inner mounting support of the forward mount assembly of FIG. 2.

Referring back to FIG. 2, inner mounting supports 130 are positioned between the outer mounting supports 120 to provide additional support to the rod 112. As shown in the FIG. 4, each inner mounting support 130 is integrally formed with the headliner 54 and includes a recess 132 sized and configured to receive a portion of the rod 112. A cap 134 is secured to the inner mounting support 130 to span the recess 132, thereby securing the rod 112 within the recess.

In the illustrated embodiment, the inclusion of two inner mounting supports 130 divides the rod 112 into a two lateral portions and central portion. Each lateral portion extends between an outer mounting support 120 and an inner mounting support 130 and has a forward visor assembly 140 mounted thereto. The central portion of the rod 112 extends between the two inner mounting supports 130 and provides a mount for other accessories, configured to be mounted to the bar 112, such as a phone mount, navigation system, sunglasses clip, switch panel, or any other accessory that may be advantageously mounted between the forward visor assemblies 140.

The number, configuration, and location of mounting brackets are not limited to the disclosed configuration. Further, the disclosed rod 112 may be replaced by several rods forming a continuous mounting surface or a plurality of separate, discontinuous mounting surfaces. In addition, the mounting supports, the rod, or portions thereof may be integrally formed with components of the vehicles, or these parts may be attached to the vehicle using know attachment means. These and other configurations are contemplated and should be considered within the scope of the present disclosure.

Figure 5:
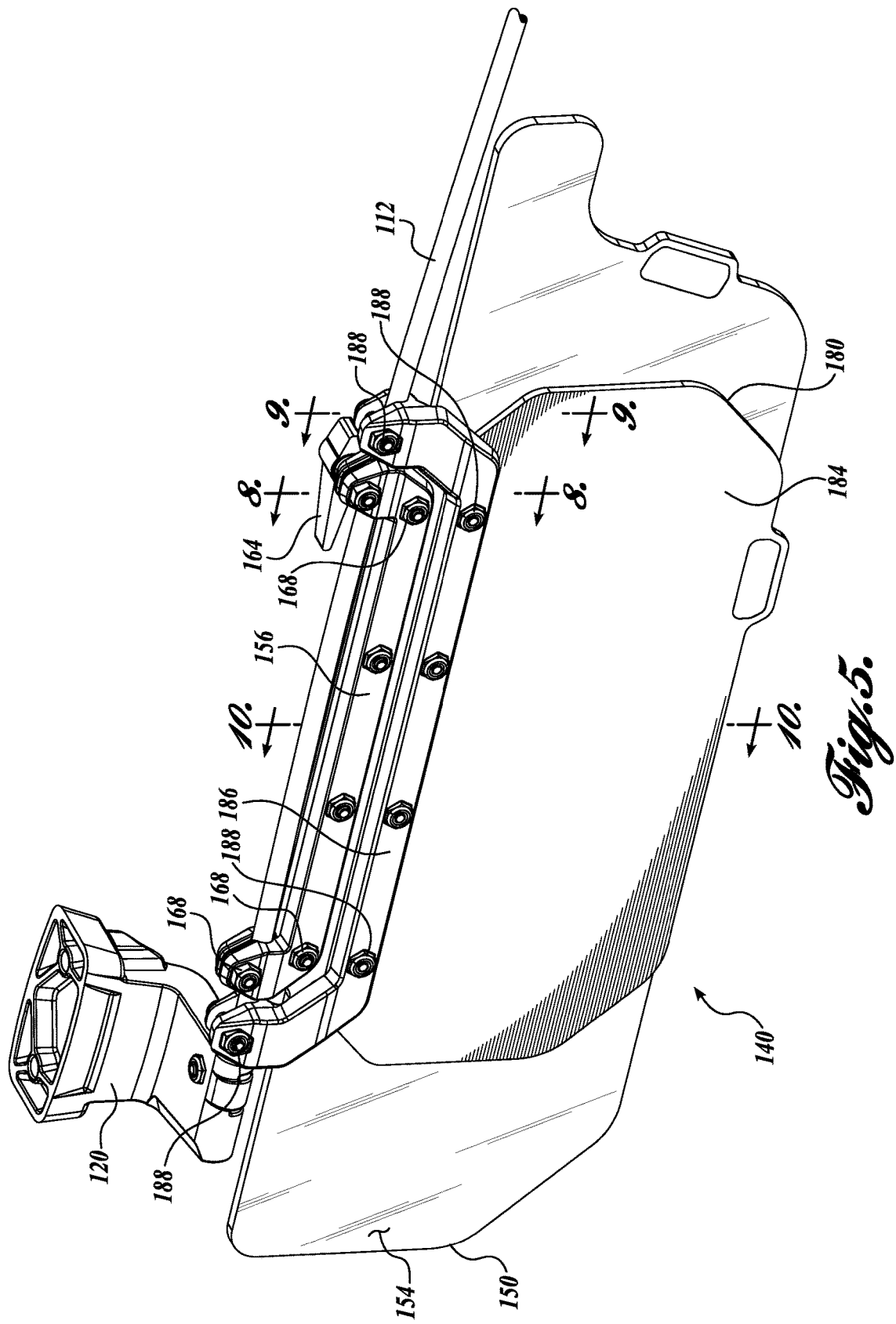
FIG. 5 shows a top rear isometric view of one of the forward visor assemblies of FIG. 2, with a first visor and a second visor each in a deployed position.
Figure 8:
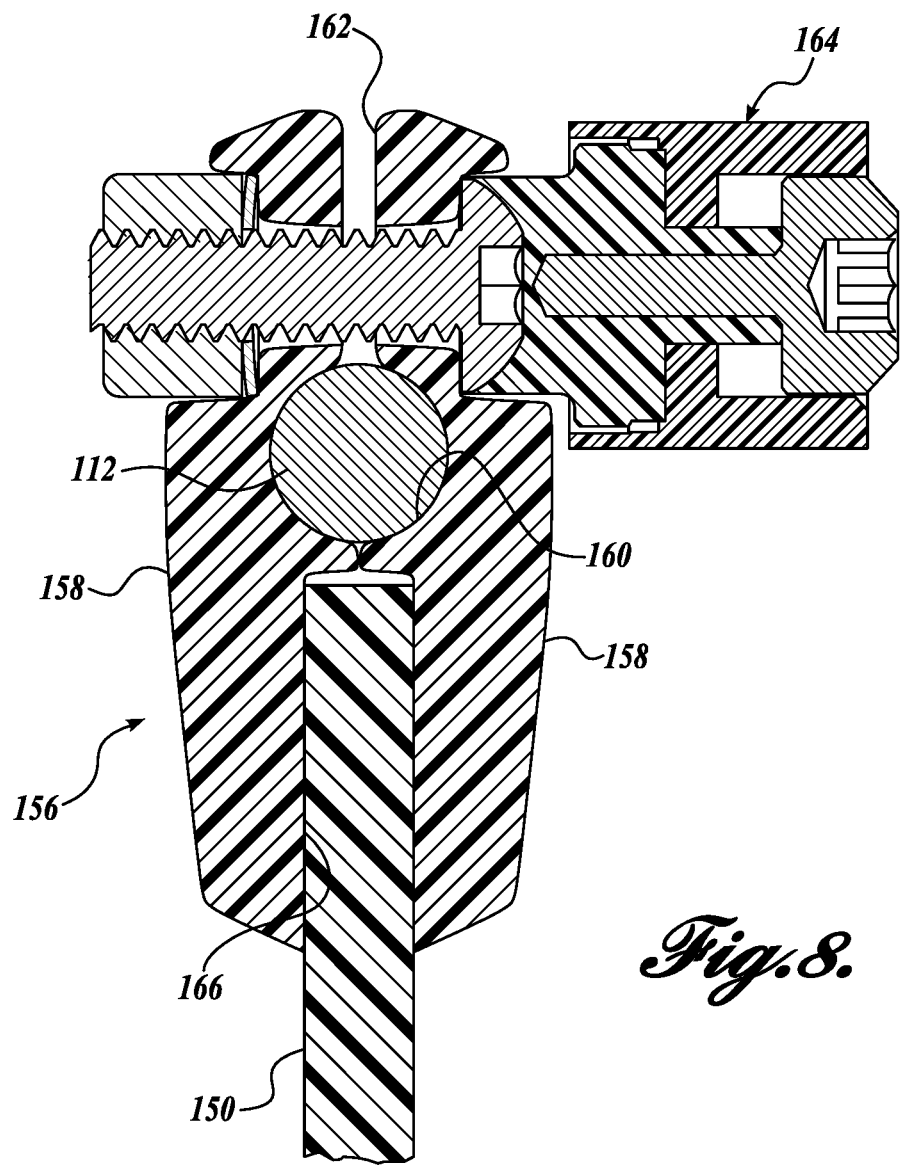
FIG. 8 shows a partial cross-sectional view of a bracket of the first visor shown in FIG. 5.

FIG. 5 shows a forward visor assembly 140 mounted to a portion of the rod 112 of the forward mount assembly 110. The visor assembly 140 includes a first visor 150 and a second visor 180, each of which is rotatable mounted to the rod 112. As best shown in FIGS. 5 and 8, the first visor 150 is coupled to a mounting bracket 156 formed by two C-shaped fittings 156 cooperating to form a central aperture 160 for receiving the rod 112 and a slot 166 for receiving an upper end of the first visor 150. A plurality of fasteners 168 extend through the fittings 156 and, preferably, through the first visor 150 to secure the first visor to the mounting bracket 156. One or more additional fasteners 168 and an optional clamp 164 apply an adjustable clamping force to the bracket 156 in the area of the slot 162 to secure the bracket to the rod 112. The clamping force is adjustable to provide that the first visor 150 is easily rotated by hand, will stay in a stowed (horizontal) position, even under extreme vehicle operating conditions, and will not slide axially along the rod. It is contemplated that a number of suitable mounting configurations can be employed to provide these features, and such alternate embodiments should be considered within the scope of the present embodiment.

Figure 9:
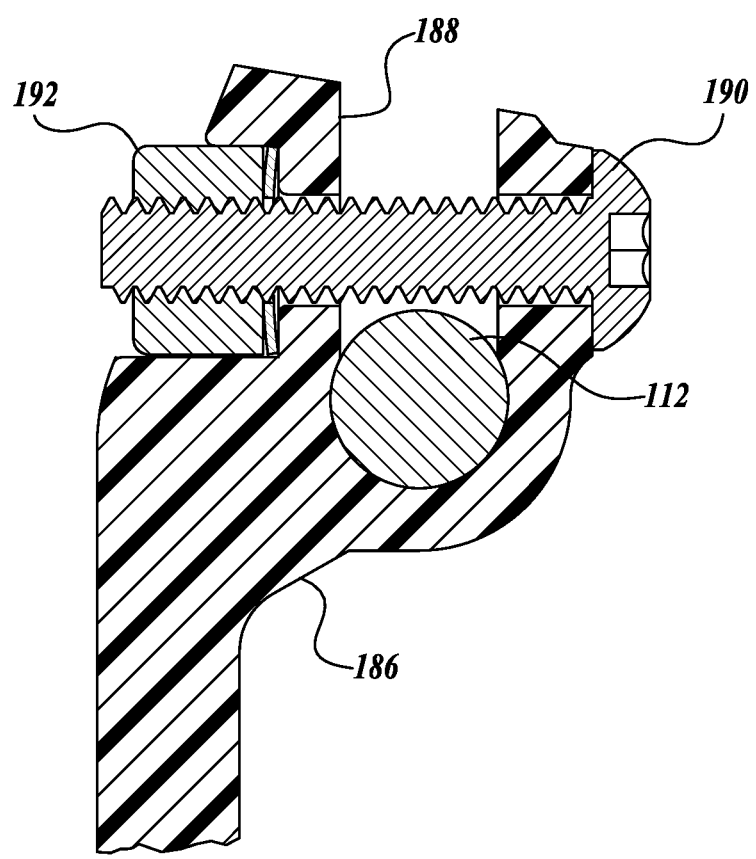
FIG. 9 shows a partial cross-sectional view of a bracket of the second visor shown in FIG. 5.

As best shown in FIGS. 5 and 9, the second visor 180 is coupled to a C-shaped mounting bracket 186 with a clevis 188 at each end. Referring to FIG. 9, each clevis 188 has an upward facing opening sized and configured to receive the rod 112. One or more fasteners 188 apply an adjustable clamping force to the clevis 188 to secure the clevis to the rod 112. The clamping force is adjustable to provide that the second visor 180 is easily rotated by hand, will stay in a stowed (horizontal) position, even under extreme vehicle operating conditions, and will not slide axially along the rod. Additional fasteners 188 couple the second visor 180 to the mounting bracket 186. It is contemplated that a number of suitable mounting configurations can be employed to provide these features, and such alternate embodiments should be considered within the scope of the present embodiment.

Figure 10:
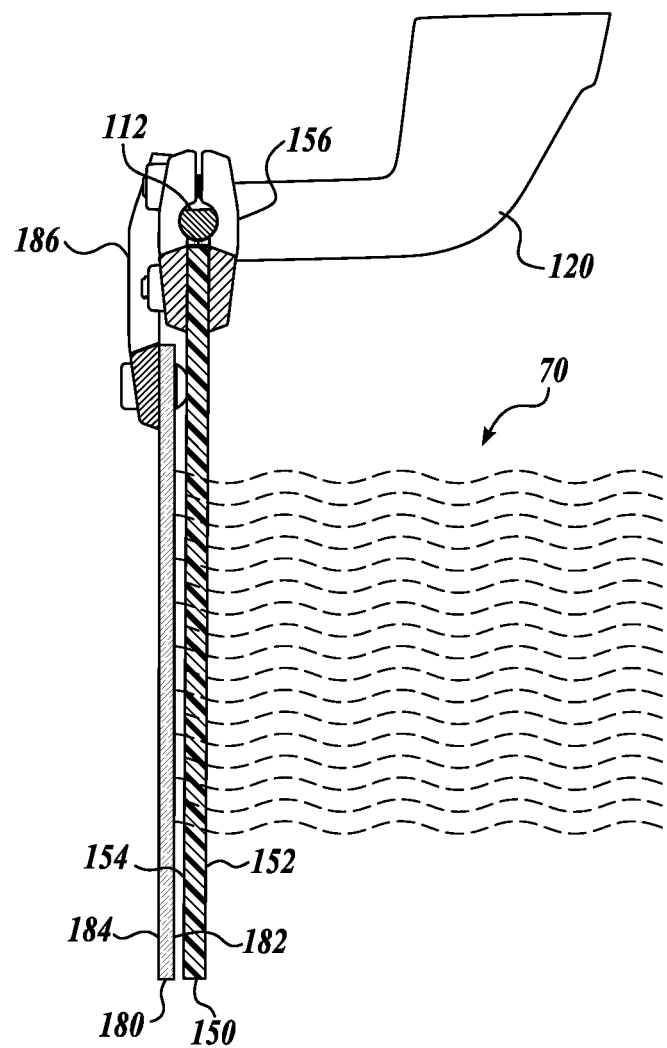
FIG. 10 shows a cross-sectional cut of the forward visor assembly of FIG. 5, wherein the first visor is translucent and the second visor is opaque.

Referring back to FIG. 5, the mounting bracket 156 for the first visor 150 is shorter and shallower than the mounting bracket 186 for the second visor 180. As a result, the mounting brackets 156 and 186 can be rotatably coupled to the rod 112 such that the mounting bracket 156 for the first visor 150 "nests" within the mounting bracket 186 for the second visor 180. As best shown in FIG. 10, the mounting bracket 156 for the first visor 150 is configured so that first visor 150 extends radially from the center of the rod 112. The mounting bracket 180 of the second visor 180 is configured so that the second visor is offset from the centerline of the rod 112 and, therefore also from the first visor 150. With the first mounting bracket 156 nesting within the second mounting bracket 156 and the second visor 180 being offset from the first visor 180, the first and second visors are rotatably mounted to the rod 112 so that at least a portion of the second visor overlaps a portion of the first visor. It will be appreciated that the disclosed mounting configuration is exemplary and should not be considered limiting. In this regard, variations to the disclosed embodiment may be utilized to rotatably mount first and second visors to at least partially overlap each other, and such variations should be considered within the scope of the present disclosure.

The described mounting configuration enables various stowed/deployed configurations of the first visor 150 and a second visor 180. FIGS. 5 and 10 show a configuration in which the first and second visors 150 and 180 extend downward from the rod 112 into the path of at least a portion of incident light 70 coming in through the windshield. When so deployed, the first visor 150 has a forward first face 152 and a rear second face 154. The second visor 180, which is generally parallel to the first visor 150, has a forward first face 182 proximate to the second face 154 of the first visor 150. The second visor 180 also has a rear second face 184. As a result, the first visor 150 and second visor 180 are both in the path of the incident light 70 such that incident light strikes the first face 152 of the first visor before exiting the second face 154 and striking the first face 182 of the second visor.

Figure 6:
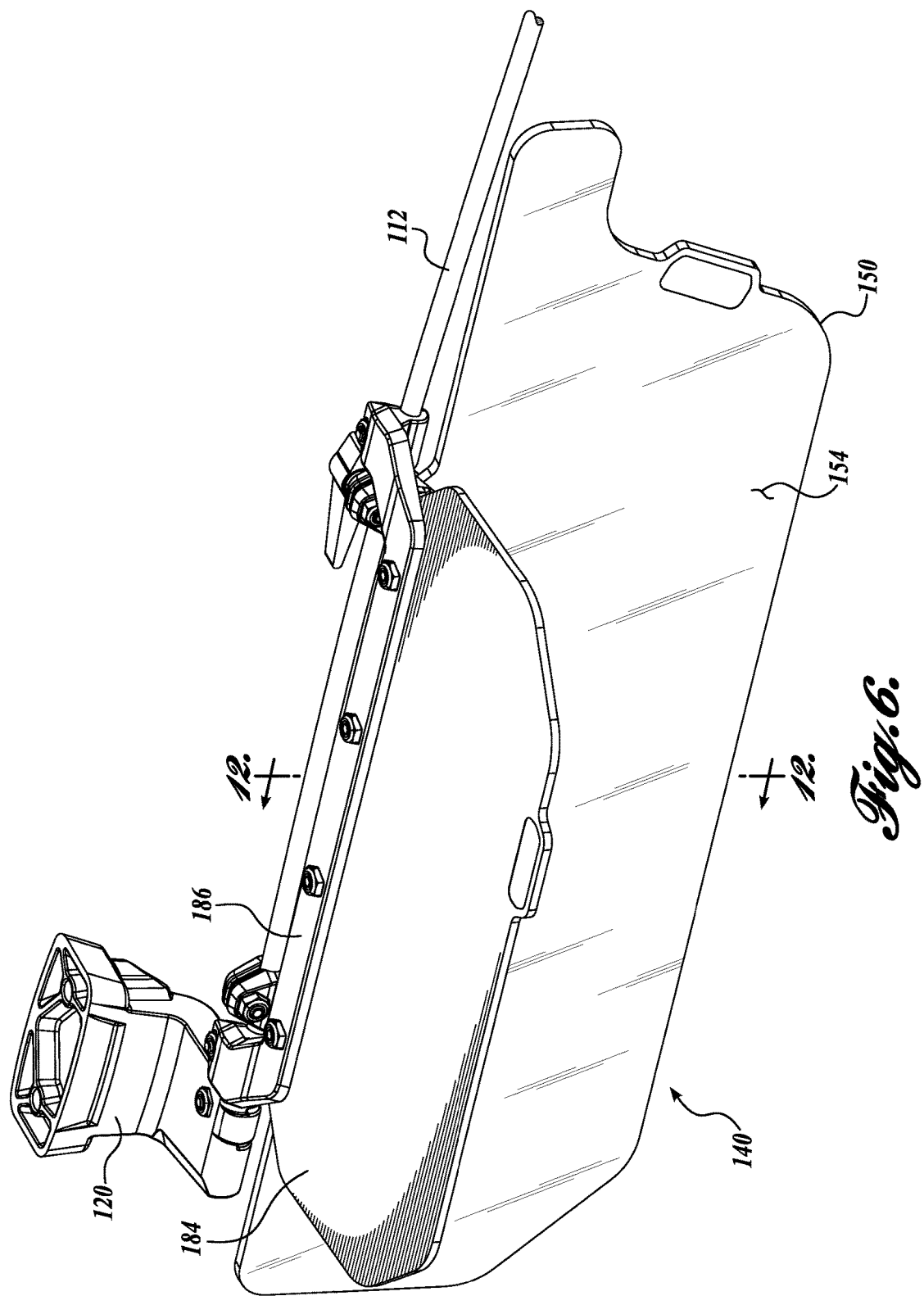
FIG. 6 shows a top rear isometric view of the forward visor assembly of FIG. 5, with the first visor in a deployed position and the second visor in a stowed position.
Figure 12:
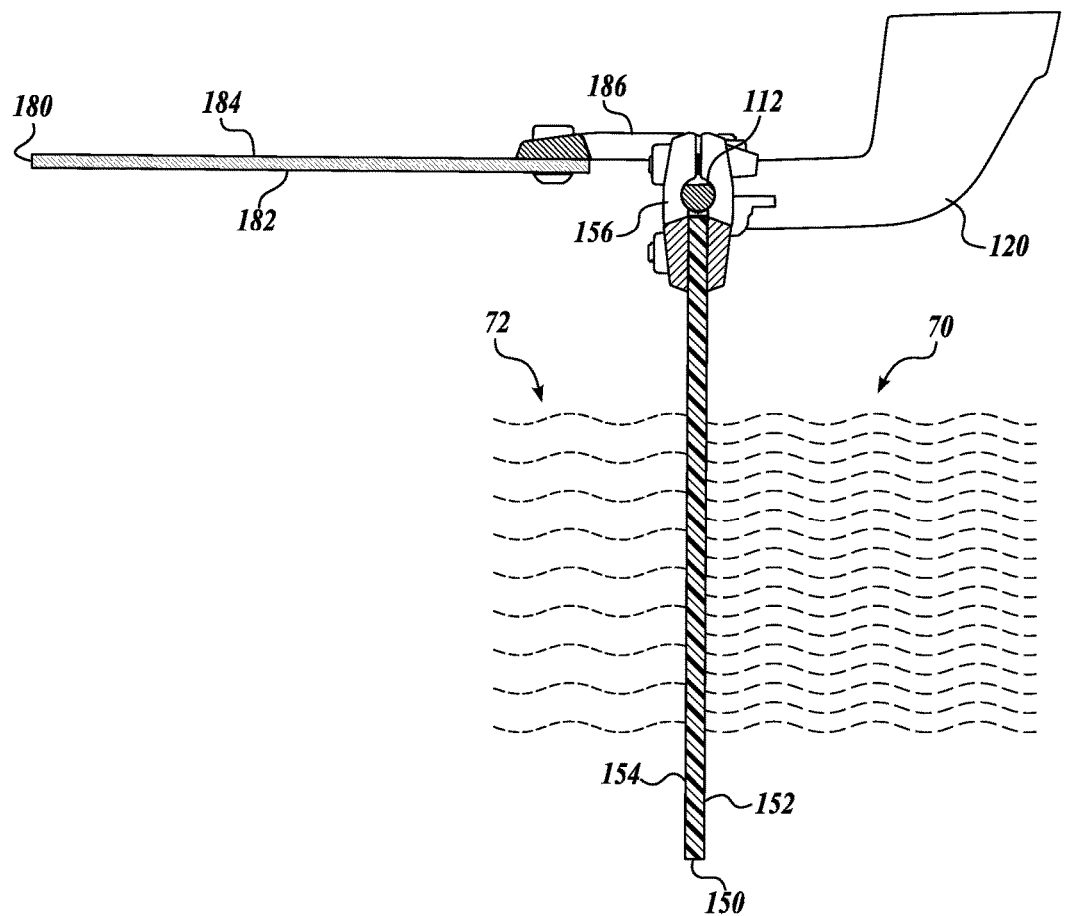
FIG. 12 shows a cross-sectional cut of the forward visor assembly of FIG. 6.

FIGS. 6 and 12 show a second configuration in which the first visor 150 is deployed and the second visor 180 is stowed. As a result, only the first visor 150 is in the path of the incident light 70 such that the incident passes through the first visor, but proceeds from the first visor in a path generally unimpeded by the second visor 180.

Figure 7:
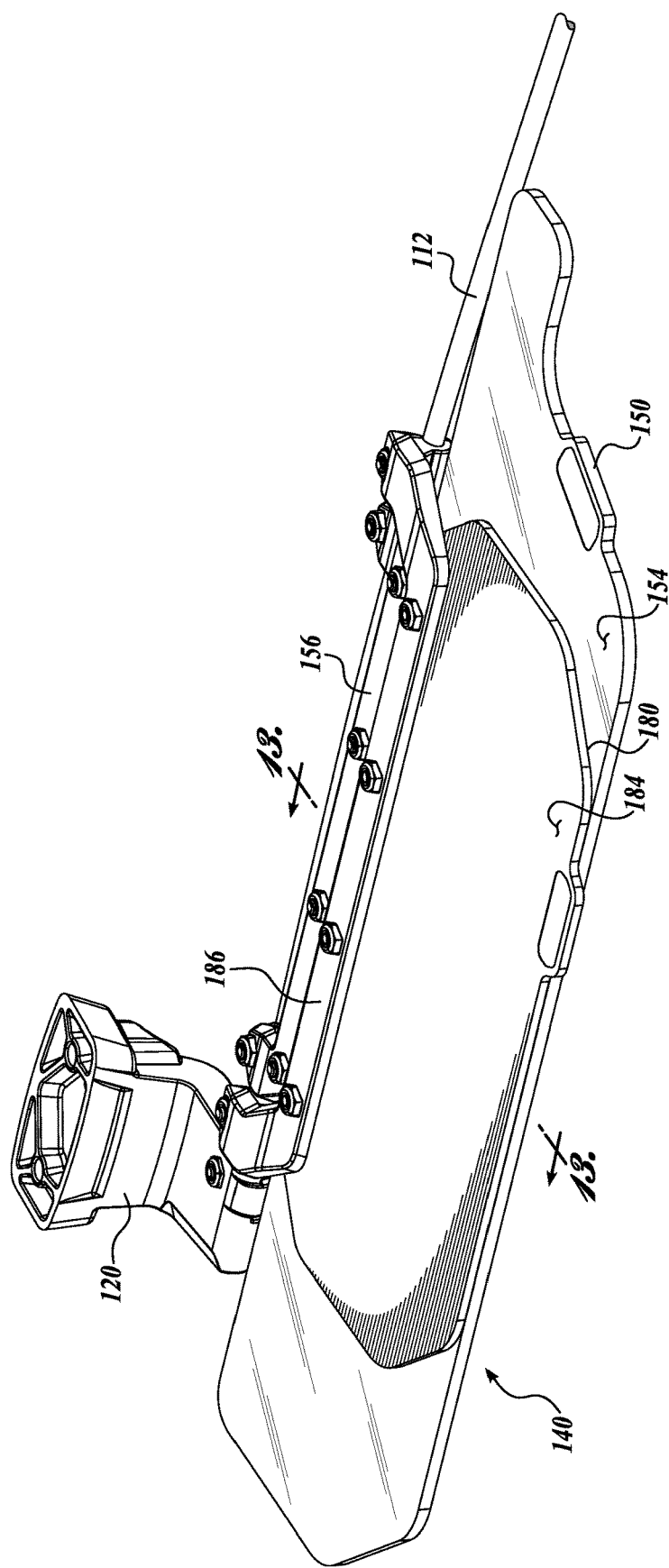
FIG. 7 shows a top rear isometric view of the forward visor assembly of FIG. 5, with the first visor and the second visor each in a stowed position.

In FIGS. 7 and 12, both the first visor 150 and the second visor 180 are in the stowed position and generally out of the path of incident light entering through the windshield. As a result, the visors 150 and 180 do not significantly interact with the incident light and, therefore, do not provide any glare reduction.

With an exemplary embodiment of the structural configuration of the sun visor assembly 100 in mind, the selection of visor material and the resulting functionality of the sun visor assembly will now be described.

Figure 13:
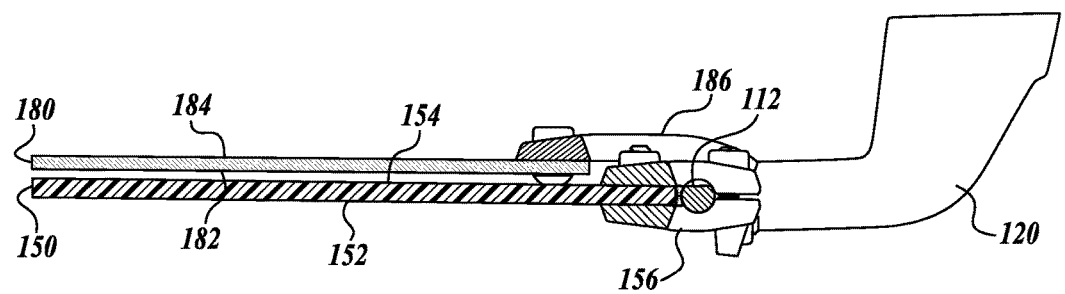
FIG. 13 shows a cross-sectional cut of the forward visor assembly of FIG. 7.

FIGS. 10, 12, and 13 show an embodiment in which the first visor 150 is at least partially formed from a translucent material having a VLT that provides a desirable level of glare reduction while still allowing objects outside the car to be visible through the visor. The second visor 180 is formed from an opaque material and functions like a typical sun visor to prevent incident light from passing through the visor. In some contemplated embodiments, the second face 184 has a reflective portion to act as a mirror.

As shown in FIG. 10, when the first and second visors 150 and 180 are both in a deployed position, incident light 70 strikes the first face 152 before traveling through the first visor 150 and exiting through the second face 154. Because the first visor 150 is tinted, only a portion of incident light 70 passes through the first visor 150, wherein the amount of light passing through is determined by the VLT of the visor material. Still referring to FIG. 10, light that exits the second face 154 of the first visor 150 strikes the first face 182 of the second visor 180. Because the second visor 180 is opaque, further transmission of the light is prevented, and the full amount of incident light 70 striking the visor is blocked to provide maximum glare reduction.

Referring now to FIG. 12, the visor configuration of FIG. 10 is shown with the second visor 180 moved to a stowed position. Similar to the configuration of FIG. 10, incident light 70 strikes the first face 152 of the first visor 150. A portion of the incident light 70 exits the second face 154 of the first visor as transmitted light 72, wherein the ratio of transmitted light to incident light corresponds to the VLT of the visor material. With the second visor 180 in the stowed position, the transmitted light 72 is not further impeded by the sun visor assembly 100. As a result, the configuration of FIG. 12 provides a glare reduction that is less than that provided by the configuration shown in FIG. 10.

FIG. 13 shows the visor arrangement of FIG. 10 with both the first and second visors 150 and 180 in a stowed position. With the visors in a stowed position, the sun visor assembly 100 is effectively disengaged, i.e., the visor assembly does not block any incident light and provides no glare reduction.

Figure 11:
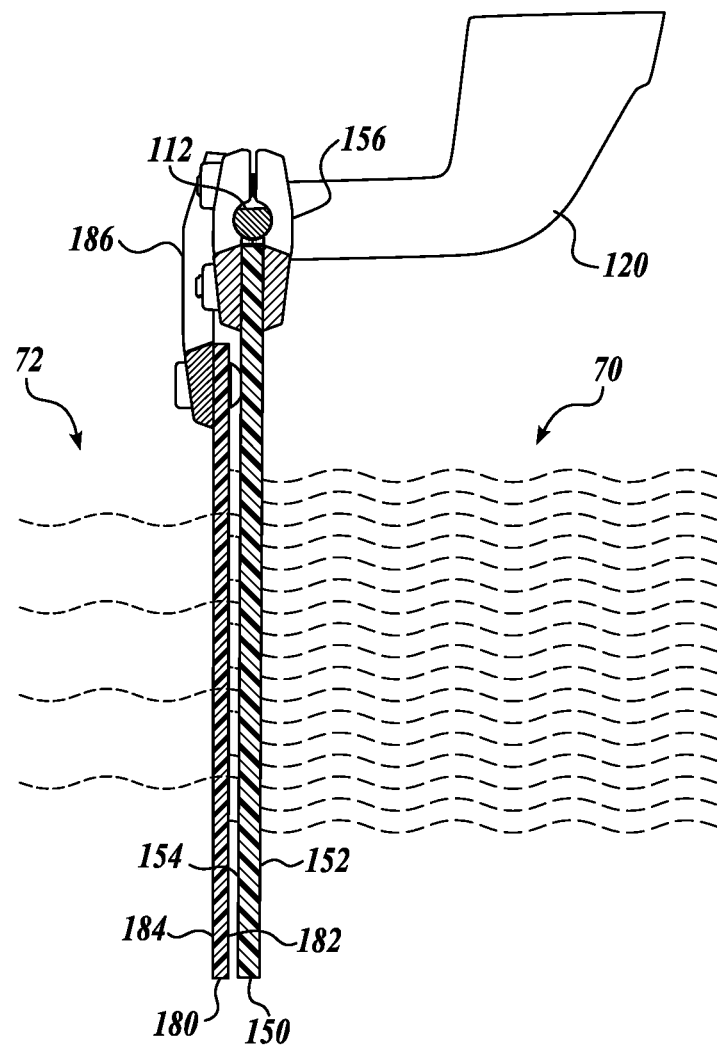
FIG. 11 shows a cross-sectional cut of the forward visor assembly of FIG. 5, wherein the first and second visors are translucent.

FIG. 11 shows an alternate embodiment of the sun visor assembly 100 of FIGS. 10, 12, and 13. The embodiment of FIG. 11 is similar to the previously described embodiment except for the second visor 180. Specifically, instead of being formed from an opaque material, the second visor 180 is formed from a translucent material with a desirable VLT. In this regard, when the first and second visors 150 and 180 are both in a deployed position, incident light passes through both visors. The total filtering effect of the first and second visors is the product of the individual filtering effect of each of the first and second visors. That, the first visor 150 has a first VLT ($VLT_1$), and the second visor 180 has a second VLT ($VLT_2$), which combine to create a total VLT for the visor ($VLT_{TOTAL}$) such that $VLT_{TOTAL}=VLT_1 \times VLT_2$. For example, if the first visor 150 has a VLT of 60%, and the second visor 180 has a VLT of 80%, then the combined VLT of the visors ($VLT_{TOTAL}$) is 48%.

The described embodiments of a sun visor assembly 100 allow a user to select a level of glare reduction by choosing a configuration with a suitable total VLT. For example, in the embodiment of FIG. 10, in which the first visor 150 has a first VLT ($VLT_1$) and the second visor 180 has a second VLT ($VLT_2=0$), i.e., the second visor is opaque, a user can selectively position the visors so that the effective VLT of the sun visor assembly is 100% (both visors stowed), $VLT_1$ (first visor deployed, second visor stowed), or 0% (both visors deployed). That is, a user can deploy one or both visors desired to provide full blocking of incident light (both visors deployed) or only partial blocking of incident light (first visor 150 deployed/second visor 180 stowed). In this manner, a user can deploy the visor according to environmental conditions and personal preferences to provide a level of glare reduction that is best suited to a particular situation.

In the embodiment of FIG. 11, in which the first visor 150 has a first VLT ($VLT_1$) and the second visor 180 has a second VLT ($VLT_2$), a user can selectively position the visors so that the effective VLT of the sun visor assembly is 100% (both visors stowed), $VLT_1$ (first visor deployed, second visor stowed), or $VLT_{TOTAL}$ (both visors deployed), wherein $VLT_{TOTAL}=VLT_1 \times VLT_2$. This provides a user options for selecting a different glare reduction levels that are not available using known visor configurations. For example, in one exemplary embodiment, $VLT_1$ is in the range of 33%-90%, and $VLT_2$ is in the range of 50%-90%. However, it will be appreciated that any suitable values for $VLT_1$ and $VLT_2$ can be selected to provide a user with desirable values for $VLT_1$ (first visor deployed) or $VLT_{TOTAL}$ (first and second visors deployed), wherein both $VLT_1$ and $VLT_2$ are between 0% and 100%.

VLT each both visors can be selected to provide different desired level of glare reduction. Such factors can take into account personal preferences, typical weather conditions in the area in which the vehicle will be operated, a level of tint on the vehicle window, etc. In this regard, the present disclosure is not limited to first and/or second visors with particular VLT or ranges, but can include any VLT or range of VLTs suitable for use in vehicle visor. Further, the VLT of the visors can be an inherent property of the chosen material, a result of a tinting film applied to one or more faces of the visor, or a combination of factors including known processes and materials for providing a tinted translucent material. The use of such variations and combinations of visor materials is contemplated and should be considered within the scope of the present disclosure.

Referring now to FIGS. 14-16, a representative embodiment of a side visor assembly 240 is shown. The side visor assembly 240 is similar to the previously described forward visor assembly 140, and the following description will proceed with the understanding that parts of the side visor assembly 240 designated with a 200-series reference number (2XX) correspond to similar part from the forward visor assembly 140 designated with a 100-series reference number (1XX). In addition, for the sake of brevity, not all features of the side visor assembly 240 will be described, and features not described are the same or similar to the corresponding features of the forward visor assembly 140.

Referring to FIG. 10, the side visor assembly 240 is mounted to a side roll bar 56 by a side mount assembly 210 that includes a C-shaped bar 212 coupled to the side roll bar by a forward mounting bracket 220 and a rear mounting bracket 230. A first visor 250 and second visor 280 are rotatably mounted to the bar 212 with brackets 256 and 286, respectively. The first and second visors 250 and 280 cooperate in manner similar to the first and second visors 150 and 180 of the forward visor assembly 140, except that the incident light being blocked or filtered generally comes laterally through side window rather than through a windshield. It will be appreciated that variations between the side visor assembly 240 and the forward visor assembly 140 may exist due to different spatial constraints, mounting structure, etc. and such variations should be considered within the scope of the present disclosure.

While illustrative embodiments have been illustrated and described, it will be appreciated that various changes can be made therein without departing from the spirit and scope of the invention.

The embodiments of the invention in which an exclusive property or privilege is claimed are defined as follows:

1. A visor assembly for a vehicle, comprising:
    (a) a mount assembly secured to a portion of the vehicle, the mount assembly having a rotation axis;
    (b) a first visor rotatably mounted to the mount assembly to be selectively moveable about the rotation axis between a first stowed position and a first deployed position extending downward from the mount assembly, the first visor having a first face and a second face, the first visor being at least partially translucent; and
    (c) a second visor rotatably mounted to the mount assembly, the second visor being selectively movable about the rotation axis between a second stowed position and a second deployed position extending downward from the mount assembly, the second visor having a first face and a second face, the first face of the second visor being proximate to the second face of the first visor when the first visor is in the first deployed position and the second visor is in the second deployed position, wherein at least a portion of light traveling through the first visor exits the second face of the first visor and strikes the first face of the second visor.

2. The visor assembly of claim 1 wherein the second visor is at least partially opaque to prevent light striking the first face of the second visor from passing through the second visor when the first visor is in the first deployed position and the second visor is in the second deployed position.

3. The visor assembly of claim 1, wherein the second visor is at least partially translucent so that at least a portion of light striking the first face of the second visor passes through the second visor when the first visor is in the first deployed position and the second visor is in the second deployed position.

4. The visor assembly of claim 1, wherein at least a portion of the second face of the second visor has a reflective surface.

5. The visor assembly of claim 1, wherein the first visor has a first visible light transmission (VLT), and the second visor has a second VLT.

6. The visor assembly of claim 5, wherein the first VLT is greater than the second VLT.

7. The visor assembly of claim 5, wherein the first VLT is in a range of 33% to 90%.

8. The visor assembly of claim 7, wherein the first VLT is in a range of 50% to 90%.

9. A visor assembly mountable to a vehicle, the visor assembly comprising:
(a) a rod mounted within the vehicle, the rod defining a central axis;
(b) a first visor rotatably coupled to the rod, the first visor being selectively rotatable about the central axis between a first stowed position and a first deployed position, the first visor having a first visible light transmission (VLT) percentage, and
(c) a second visor rotatably coupled to the rod, the second visor being selectively rotatable about the central axis between a second stowed position and a second deployed position, the second visor having a second VLT percentage,
wherein the first and second visors extend downward from the rod in the first and second deployed positions, respectively, so that the first and second visors are in a line of sight of a vehicle operator.

10. The visor assembly of claim 9, wherein the second visor is selectively rotatable to the second stowed position while the first visor is in the first deployed position.

11. The visor assembly of claim 9, wherein rotation movement of the first visor moves from the first deployed position to the first stowed position moves the second visor from the second deployed position to the second stowed position.

12. The visor assembly of claim 1, wherein the first and second visors are repositionable along the rotation axis with respect to the mount assembly.

13. The visor assembly of claim 9, wherein the first and second visors are repositionable along the central axis with respect to the rod.

* * * * *